G. A. ANDERSON.
CAR TRUCK.
APPLICATION FILED JAN. 23, 1922.
1,414,923.
Patented May 2, 1922.
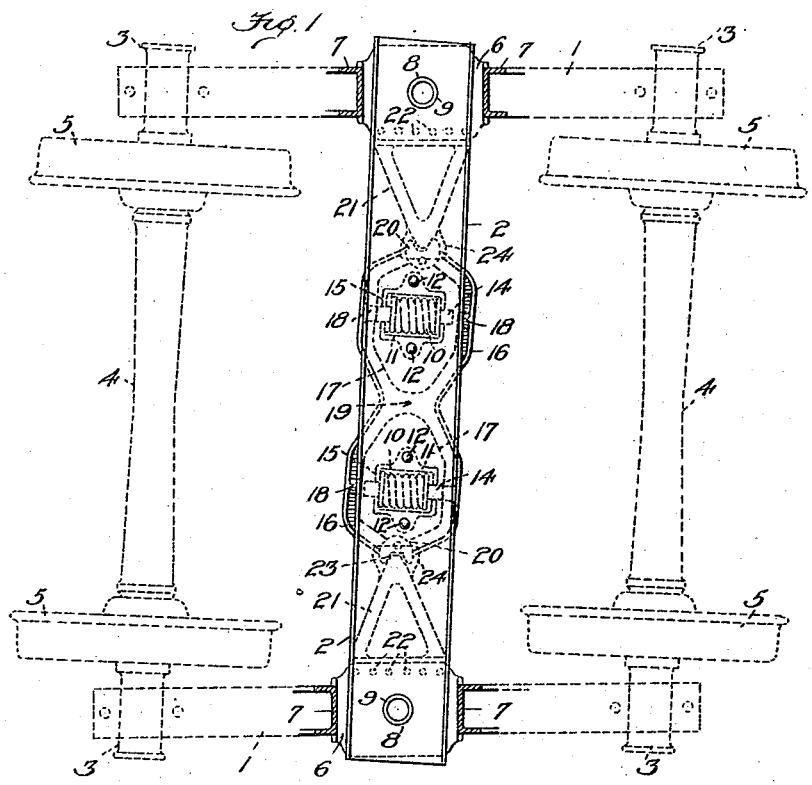
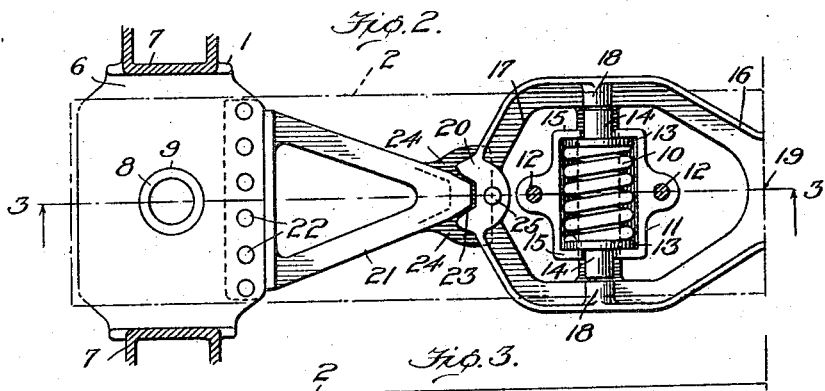
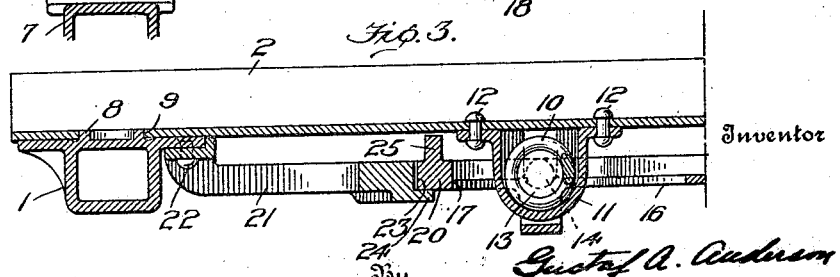
Witness
Edwin L. Bradford
Inventor
Gustaf A. Anderson
By his Attorney

UNITED STATES PATENT OFFICE.

GUSTAF A. ANDERSON, OF BALTIMORE, MARYLAND, ASSIGNOR TO THE T. H. SYMINGTON COMPANY, OF NEW YORK, N. Y., A CORPORATION OF DELAWARE.

CAR TRUCK.

1,414,923.

Specification of Letters Patent.

Patented May 2, 1922.

Application filed January 23, 1922. Serial No. 531,246.

*To all whom it may concern:*

Be it known that I, GUSTAF A. ANDERSON, a citizen of the United States, residing at Baltimore city, in the State of Maryland, have invented certain new and useful Improvements in Car Trucks; and I do hereby declare the following to be a full, clear, and exact description of the invention, such as will enable others skilled in the art to which it appertains to make and use the same.

My invention relates to flexible car trucks embodying truck squaring mechanism operatively controlled by the displacement movement of the side frame members of the truck. In flexible car trucks means is provided for permitting temporary displacement of the truck so as to assume an out of square relation, allowing the truck parts to be relieved from the deteriorating and destructive effects of forces or blows applied to the truck as an incident of its passage around curves, and as the result of inequalities in the track, such as projecting switch points, defective rail joints or other imperfections in the track or truck wheels.

An object of the invention, generally stated, is to provide simple, durable and effective means for yieldingly maintaining the truck in square relation, the said means including a lever interposed between the side frame members of the truck and a suitable yielding device for transmitting the displacement movement of said side frames to the yielding device where it is absorbed and cushioned, and to also impart from said yielding device restoration movement to the side frames for returning them to normal square position.

More particularly stated, the principal object of the invention is to provide a lever of the floating type interconnected with the yielding means and the side frame members, and arranged to be actuated by the displacement movement of said side frame members, causing as a result the energization or compression of the yielding means from which means the restoration forces are derived and transmitted through said floating lever for returning the side frame members to normal position upon cessation of the action of the forces producing the displacement movement.

In the present invention other advantages of construction, location and operation of the lever are to be found, as will hereinafter appear.

The accompanying drawings illustrate an embodiment of my improved type of floating lever constructed in accordance with my invention, the scope whereof is pointed out in the claims.

Figure 1 is a sectional plan view, partly diagrammatic, of a car truck to which has been applied my invention, the parts being shown in the angular relations they assume when passing around a sharp curve.

Figure 2 is a detail plan view of one end of the lever shown in normal square relation to the side frame members, the spring plank or connecting means being removed but its normal position being indicated by the dot and dash lines; and Figure 3 is a vertical sectional view on the line 3—3 of Figure 2, the spring plank being shown in its related position to the other parts.

My improved squaring mechanism is incorporated within the truck and is operatively controlled by the side frame members, it being preferable to utilize as many of the truck parts as possible to effectively achieve the objects of my invention. The side frame members 1 are normally connected by transversely extending means 2 which in the present embodiment I have shown as comprising the spring plank. This connecting means 2 is not limited to the spring plank but may be the bolster or other part capable of performing the functions of these truck elements, and in some cases may be a cross-connection independent of said truck parts.

Each side frame member is provided at its ends with journal boxes (not shown) into which extend the journal ends 3 of axles 4 carrying the truck wheels 5.

The means 2 connecting the side frame members extends transversely across the truck, the ends of said means preferably extending into the bolster openings 6 between the columns 7. The space between the columns 7 is sufficiently large to permit the connecting means to turn through the requisite angle corresponding to the relative displacement movement from normal position which the side frame members may be designed to have. Where, as in the present case, the spring plank is used to function as a cross connecting member, sufficient clearance is similarly provided for permitting the bolster to change its angular relation to the side frame members when the latter move longitudinally of the truck.

The spring plank connecting means 2 is pivotally attached to each side frame member 1, a pivot boss 8 extending upwardly from each side frame and entering a correspondingly shaped opening or pivot bearing 9 in each end of the spring plank.

The yieldable mechanism for restoring the side frame members to normal square position includes in the embodiment shown, spring resisting and cushioning devices capable of effectively resisting the displacement movement of the side frame members and absorb such shocks or blows as may be transmitted to the truck. The displacement movement of the side frame members 1 serves to energize or compress the spring devices. It will be obvious, however, that the duty of yieldingly restraining longitudinal and other departure of the side frame members 1 from their normal square position may be performed by a single yieldable mechanism or spring device, since the restoration of the cross-connecting means 2 to normal position, even though enforced by a single spring device, will result in the return of both side frames to normal square position. In the present disclosure I prefer to use at least two yieldable or spring devices carried by the spring plank connecting means 2 and positioned for co-action with the respective ends of the lever.

The spring devices each comprises springs 10 positioned within pockets or housings 11 which latter are secured by rivets 12 to the underside of the spring plank 2. In practice the springs are assembled under considerable initial compression and have cooperating with each end thereof followers 13 provided with extensions 14 arranged to project beyond the end abutment walls 15 of the housing 11. The extensions 14 of the followers 13 are designed to be engaged by portions of the floatingly suspended lever 16 interposed between the yieldable devices and the side frames of the truck.

The lever 16, constituting a part of the yieldable mechanism, is of the floating type preferably suspended beneath the spring plank and in spaced relation thereto. It comprises a relatively flat skeleton-like frame provided at each end with yokes 17 arranged to fit about each of the respective yielding spring devices. The opposite inner faces of each yoke portion are arranged to engage the respective opposite ends of the spring devices and more particularly the follower extensions as shown. Pins or bosses 18 are preferably formed integral with the frame of the lever, said pins or bosses constituting oppositely alined projections or lugs upon intermediate portions of the lever between which are interposed the spring devices. The inner opposite sides of the lever, when positioned relatively close to the follower extensions 14 will also serve to actuate and compress the spring device from whichever end the force is imparted, and the pins or bosses referred to are of but structural value only. In normal square position the lever assumes a position parallel with the spring plank 2, each yoke 17 and the inner faces thereof being substantially in contact with, or arranged relatively close to, as shown in Figure 2, the extensions 14 of the followers 13. Lateral movement of the lever transversely of the spring plank is prevented except as the spring devices are operated, and as the lever is actuated from the ends thereof, the action of said lever is to move about an imaginary pivot centrally located of the lever and the spring plank, the turning point of said imaginary pivot being indicated by the numeral 19. Greater freedom of action is obtained by floatingly mounting the lever and permitting the pivotal or fulcrum point to relatively shift if occasion requires.

Each end 20 of the lever is arranged for engagement by the side frame members, and more particularly an arm 21 rigidly carried by and extending inwardly from said side frames. The arm 21 is shown as secured to each side frame member by means of rivets 22, and comprising a triangular bracket, the inner apex of which is arranged to enter a recess 23 formed on the end of the lever. The side walls of each recess are designed to operate against the side faces of the apex of the respective brackets and form a loose connection between the said lever and side frame members. This forms a simple, strong and responsive connection for transmitting the displacement impact and the restoring movement through the lever to the yieldable devices.

The means for floatingly supporting the lever includes the arms 21 upon each of which is provided a flange or lip 24 adapted to pass beneath each end of the lever. As shown in Figure 3, the lever is suspended by means of these flanges relatively close to the underside of the spring plank. Spacing lugs or pins 25 are provided on the lever and project upwardly within close proximity to the underface of the spring plank to prevent upward movement of the lever. Various means may be utilized to suspend the floating lever and I do not wish to be understood in describing the foregoing means as limiting my invention in this respect.

The normal square positions of the lever, spring plank, and side frame members are illustrated in Figure 2. Relative displacement movement of the side frame members causes the transverse connecting means 2 to change its angular relation to said side frame members, as shown in Figure 1. When this occurs, the arms 21 carried by the side frame members bear against the respective ends of the lever 16 in opposite directions causing said lever to turn about the imaginary pivot point, before referred to, bringing one inner face of each yoke 17 into engagement with one end of the spring devices through the respective follower extensions 14, thereby compressing the springs 10 of the yielding devices. In this operation the displacement movement is transmitted through the floating lever and the shock incident to such movement is effectively cushioned or absorbed by the compressing or further energization of the springs 10.

When the forces acting upon the truck to induce relative longitudinal displacement of the side frames from their normal position, cease to act, the springs 10 which have been compressed by the preceding displacement movement, now begin to expand and in so doing force the respective ends of the floating lever in opposite directions around the imaginary pivot, causing said ends to actuate the arms 21 in forcing the side frame members into normal square position. If the side frame members of the truck are forced out of square in a direction opposite to that shown in the drawings, the springs 10 will receive the displacement shock from their opposite ends and become similarly compressed and energized for purposes of restoring the said side frames to normal square position.

The location of the floating lever, its relative length, and the supporting means therefor, together with the actuating devices provided on the side frame members, may be varied to effectively transmit the displacement and restoration movements.

I claim:—

1. In a car truck, the combination with side frame members which are relatively movable longitudinally of the truck, of means connecting said side frame members, and yieldable means interposed between said side frame members and connecting means, said yieldable means including a lever floatingly supported between said connecting means and said side frame members for energizing and transmitting displacement movements to said yieldable means, said lever also serving to impart restoring movement to the side frame members from said yielding means.

2. In a car truck, the combination with independently movable side frame members, of means connecting said side frame members, and yieldable means interposed between said connecting means and side frame members for resisting displacement of the side frame members from normal position, said yieldable means including a floating member suspended between the side frame members and said connecting means for energizing the latter.

3. In a car truck, the combination with independently movable side frame members, of means connecting said side frame members, and yieldable means interposed between said connecting means and side frame members for resisting displacement of the side frame members from normal position, said yieldable means including a lever floatingly suspended between said connecting means and side frame members, said lever having a portion thereof adapted to be actuated by the side frame members, and another portion thereof arranged to energize said yieldable means.

4. In a car truck, the combination with independently movable side frame members, of means connecting said side frame members, and yieldable means interposed between said connecting means and side frame members for resisting displacement of the side frame members from normal position, said yieldable means including a floating lever suspended between the said connecting means and side frame members, the ends of said lever being adapted to be actuated by said side frame members, and an intermediate portion of said lever being arranged to engage and energize the said yielding means.

5. In a car truck, the combination with independently movable side frame members, of means connecting said side frame members, yieldable means interposed between said connecting means and side frame members for resisting displacement of the side frame members from normal position, said yieldable means including a lever floatingly suspended between the said connecting means and side frame members, and means carried by said side frame members for engaging said lever.

6. In a car truck, the combination with independently movable side frame members, of means connecting said side frame members, yieldable means interposed between said connecting means and side frame members for resisting displacement of the side frame members from normal position, said yieldable means including a lever floatingly suspended between the said connecting means and side frame members, and means rigid with the side frame members for engaging said lever.

7. In a car track, the combination with independently movable side frame members, of means connecting said side frame members, yieldable means interposed between said connecting means and side frame members for resisting displacement of the side frame members from normal position, said yieldable means including a lever floatingly suspended from the said connecting means and side frame members, and means extending inwardly from each side frame member for engaging the ends of said lever.

8. In a car truck, the combination with independently movable side frame members, of means movably connecting said side frame members, a spring device for resisting displacement of the side frame members from normal position, means floatingly interposed between the spring device and said connecting means for transmitting displacement movement to the spring and squaring or restoring movement from said spring device to the side frame members, and means including the side frame members for actuating said floating means.

9. In a car truck, the combination with independently movable side frame members, of means movably connecting said side frame members, a spring device for resisting displacement of the side frame members from normal position, and means floatingly interposed between the spring device and said connecting means for transmitting displacement movement to the spring device for absorbing the shock and restoring movement from said spring device to the side frame members for returning them to normal position.

10. In a car truck, the combination with independently movable side frame members, of means movably connecting said side frame members, a spring device for resisting displacement of the side frame members from normal position, means floatingly interposed between the spring device and said connecting means for transmitting displacement movement to the spring device and restoring movement from said spring device to the side frame members, and means including an arm rigid with the side frame members arranged to engage said floating means.

11. In a car truck, the combination with independently movable side frame members, of means movably connecting said side frame members, a spring device for resisting displacement of the side frame members from normal position, means floatingly interposed between the spring device and said connecting means for transmitting displacement movement to the spring device and restoring movement from said spring device to the side frame members, and an arm rigid with the side frame members and arranged to loosely engage the said floating means.

12. In a car truck, the combination with independently movable side frame members, of means connecting said side frame members, spring devices mounted on said connecting means for resisting displacement of the side frame members from normal position, a floating lever having opposed side portions arranged for engagement with the respective ends of said spring device upon displacement of the side frame members from normal position, and means carried by said side frame members for actuating said lever.

13. In a car truck, the combination with independently movable side frame members, of means connecting said side frame members, spring devices mounted on said connecting means for resisting displacement of the side frame members from normal position, a lever having opposite end portions arranged to engage and energize the said spring devices from either end thereof according to the displacement movement of the side frame members for normal position, and means carried by said side frame members for actuating said lever.

14. In a car truck, the combination with movable side frame members, of means connecting said side frame members, a plurality of spring devices mounted on said connecting means for resisting displacement movement of the side frame members from normal position, a floating lever including at each end yoke portions arranged about and designed to engage either end of each of said spring devices, means carried by the side frame members for actuating said lever, and means for suspending said floating lever beneath the said means connecting the side frame members.

15. In a car truck, the combination with movable side frame members, of means connecting said side frame members, a plurality of spring devices mounted on said connecting means for resisting displacement movement of the side frame members from normal position, a lever having portions designed to engage said spring devices, means including the side frame members for actuating said lever, and means for suspending said lever in floating relation between said spring devices and the side frame members.

16. In a car truck, the combination with movable side frame members, of means connecting said side frame members, spring devices mounted on said connecting means for resisting displacement movement of the side frame members from normal position, a lever having portions designed to engage said spring devices, means including arms extending from said side frame members for actuating the lever, and means provided on said arms for suspending said lever in floating relation beneath the means connecting the side frame members.

17. In a car truck, the combination with movable side frame members, of means connecting said side frame members, spring devices mounted on said connecting means for resisting displacement movement of the side frame members from normal position, each of said spring devices including a spring and housing provided on the said connecting means and having projecting therefrom at each end a follower, a lever formed with yoke or hollow frame sections at each end thereof, the opposite inner faces of which are arranged to engage the respective followers of each spring device, and arms interposed between the side frame members and the opposite ends of said lever for actuating the latter.

18. In a car truck, the combination with movable side frame members, of a spring plank movably connecting said side frame members, yieldable devices carried by and mounted beneath said spring plank, a lever operatively associated with said yieldable devices, means for floatingly suspending said lever beneath the spring plank in spaced relation therefrom, and means carried by said side frame members and engaging said lever upon displacement of the side frame members from normal position.

In testimony whereof I affix my signature.

GUSTAF A. ANDERSON.